United States Patent
Buzescu et al.

(10) Patent No.: US 9,319,884 B2
(45) Date of Patent: Apr. 19, 2016

(54) REMOTE UNLOCKING OF TELECOMMUNICATION DEVICE FUNCTIONALITY

(71) Applicant: T-Mobile USA, Inc., Bellevue, WA (US)

(72) Inventors: Adrian Buzescu, Bellevue, WA (US); Alexandru Catalin Ionescu, Seattle, WA (US); Raymond Froelich, Redmond, WA (US); Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/840,045

(22) Filed: Mar. 15, 2013

(65) Prior Publication Data
US 2013/0210389 A1   Aug. 15, 2013

Related U.S. Application Data

(63) Continuation-in-part of application No. 13/660,350, filed on Oct. 25, 2012.

(60) Provisional application No. 61/636,499, filed on Apr. 20, 2012, provisional application No. 61/645,546, filed on May 10, 2012, provisional application No. 61/684,683, filed on Aug. 17, 2012, provisional application No. 61/552,353, filed on Oct. 27, 2011.

(51) Int. Cl.
*H04W 12/08* (2009.01)
*H04L 29/06* (2006.01)
*H04W 8/24* (2009.01)

(52) U.S. Cl.
CPC .............. *H04W 12/08* (2013.01); *H04L 63/20* (2013.01); *H04W 8/245* (2013.01)

(58) Field of Classification Search
CPC ....... H04W 12/06; H04W 4/12; H04W 8/245; H04W 12/08; H04L 64/08; H04L 63/20; G06F 21/575; G06Q 30/0255
USPC .......... 455/411, 410; 340/5.2, 691.5; 345/173
See application file for complete search history.

(56) References Cited

U.S. PATENT DOCUMENTS

| | | | |
|---|---|---|---|
| 6,226,749 B1 | 5/2001 | Carloganu et al. | |
| 6,317,836 B1 | 11/2001 | Goren et al. | |
| 6,321,079 B1 * | 11/2001 | Cooper | 455/411 |
| 6,327,660 B1 | 12/2001 | Patel | |
| 7,689,204 B2 | 3/2010 | Dupuis et al. | |
| 2005/0172135 A1 | 8/2005 | Wiersma | |

(Continued)

FOREIGN PATENT DOCUMENTS

| | | |
|---|---|---|
| EP | 1359733 A1 | 11/2003 |
| EP | 2063378 | 5/2009 |

(Continued)

OTHER PUBLICATIONS

The PCT Search Report and Written Opinion mailed Sep. 17, 2013 for PCT Application No. PCT/US13/37381, 11 pages.

(Continued)

*Primary Examiner* — Phuoc H Doan
(74) *Attorney, Agent, or Firm* — Lee & Hayes, PLLC (57) ABSTRACT

Techniques are described herein for deciding whether to unlock functionality of a telecommunication device based on one or more policies. A policy engine remote from the telecommunication device may receive, via a user interface associated with the policy engine, a request to unlock the functionality. The policy engine may then decide whether to unlock the functionality and, in response to deciding to unlock the functionality, may cause transmission of instructions to the telecommunication device to unlock the functionality.

16 Claims, 3 Drawing Sheets

(56) References Cited

U.S. PATENT DOCUMENTS

| | | |
|---|---|---|
| 2006/0075259 A1 | 4/2006 | Bajikar et al. |
| 2007/0154014 A1 | 7/2007 | Aissi et al. |
| 2007/0180269 A1 | 8/2007 | Irish et al. |
| 2008/0090614 A1 | 4/2008 | Sicher et al. |
| 2008/0132226 A1 | 6/2008 | Carnall |
| 2008/0209206 A1 | 8/2008 | Vaha-Sipila et al. |
| 2008/0229092 A1 | 9/2008 | Dale et al. |
| 2008/0282084 A1 | 11/2008 | Hatakeyama |
| 2008/0307494 A1 | 12/2008 | Holtzman et al. |
| 2009/0083858 A1 | 3/2009 | Jennings et al. |
| 2009/0158419 A1 | 6/2009 | Boyce |
| 2009/0165119 A1 | 6/2009 | Ramanath |
| 2009/0270126 A1 | 10/2009 | Liu |
| 2009/0325646 A1 | 12/2009 | Stewart et al. |
| 2010/0082968 A1 | 4/2010 | Beverly |
| 2010/0263043 A1 | 10/2010 | Xu |
| 2010/0273452 A1 | 10/2010 | Rajann et al. |
| 2010/0299744 A1 | 11/2010 | Mardiks |
| 2011/0076986 A1 | 3/2011 | Glendinning et al. |
| 2011/0081889 A1* | 4/2011 | Gao et al. ............... 455/411 |
| 2011/0130117 A1* | 6/2011 | Fan et al. ............... 455/411 |
| 2011/0130118 A1 | 6/2011 | Fan et al. |
| 2011/0159843 A1 | 6/2011 | Heath et al. |
| 2011/0307711 A1 | 12/2011 | Novak et al. |
| 2012/0042376 A1 | 2/2012 | Dolgunov et al. |
| 2012/0058743 A1* | 3/2012 | Chen ............... 455/411 |
| 2012/0083242 A1 | 4/2012 | Spitz et al. |
| 2012/0101941 A1 | 4/2012 | Kang et al. |
| 2013/0304616 A1 | 11/2013 | Raleigh et al. |
| 2014/0057597 A1 | 2/2014 | Velusamy et al. |
| 2016/0029220 A1 | 1/2016 | Obaidi |

FOREIGN PATENT DOCUMENTS

| | | |
|---|---|---|
| WO | WO2004063871 A2 | 7/2004 |
| WO | WO2008077628 A2 | 7/2008 |
| WO | WO2013158977 A1 | 10/2013 |

OTHER PUBLICATIONS

Final Office Action for U.S. Appl. No. 13/660,350, mailed on Jan. 13, 2014, Ahmad Arash Obaidi, "Mobile Device-Type Locking", 8 pages.

The PCT Search Report and Written Opinion mailed Jan. 17, 2013 for PCT Application No. PCT/US12/62050, 10 pages.

Lee, et al., "A New Delegation-Based Authentication Protocol for Use in Portable Communication Systems", IEEE Transactions on Wireless Communications, vol. 4, No. 1, Jan. 2005, pp. 57-64.

Office Action for U.S. Appl. No. 13/660,350, mailed on Jul. 22, 2013, Obaidi, "Mobile Device-Type Locking", 8 pages.

The PCT Search Report and Written Opinion mailed Jul. 1, 2013 for PCT Application No. PCT/US13/37345, 10 pages.

The PCT Search Report and Written Opinion mailed Jul. 30, 2013 for PCT Application No. PCT/US13/37332, 13 pages.

Office action for U.S. Appl. No. 13/660,350, mailed on Aug. 7, 2014, Froelich et al., "Mobile Device-Type Locking", 8 pages.

Office Action for U.S. Appl. No. 13/796,550, mailed on Jan. 26, 2015, Senthil Kumar Mulluppadi Velusamy, "SIM Level Mobile Security", 18 pages.

Office Action for U.S. Appl. No. 13/842,116, mailed on Jan. 27, 2015, Ahmad Arash Obaidi, "Secure Lock for Mobile Device", 7 pages.

Office Action for U.S. Appl. No. 13/839,189, mailed on Feb. 24, 2015, Alexandru Catalin Ionescu, "Secure Environment for Subscriber Device", 8 pages.

Extended European Search Report mailed May 20, 2015 for European Patent Application No. 12843678.9, 8 pages.

Office Action for U.S. Appl. No. 13/839,189, mailed on Aug. 21, 2015, Ionescu et al., "Secure Environment for Subscriber Device", 7 pages.

Extended European Search Report mailed Nov. 11, 2015 for European patent application No. 1377892238, 6 pages.

Extended European Search Report mailed Nov. 27, 2015 for European patent application No. 13778691.9, 9 pages.

Office Action for U.S. Appl. No. 14/874,023, Obaidi, mailed on Dec. 21, 2015, 7 pages.

Office action for U.S. Appl. No. 13/839,189, mailed on Dec. 23, 2015, Ionescu et al., "Secure Environment for Subscriber Device", 14 pages.

Office action for U.S. Appl. No. 13/796,550, mailed on Jan. 11, 2016, Velusamy et al., "SIM Level Mobile Security", 20 pages.

* cited by examiner

REMOTE UNLOCKING OF TELECOMMUNICATION DEVICE FUNCTIONALITY

CROSS REFERENCE TO RELATED PATENT APPLICATIONS

This patent application claims priority filing benefit from U.S. Provisional Patent Application No. 61/636,499, filed Apr. 20, 2012, U.S. Provisional Patent Application No. 61/645,546, filed May 10, 2012, and U.S. Provisional Patent Application No. 61/684,683, filed Aug. 17, 2012, which are hereby incorporated by reference, in their entirety. This patent application is also a continuation-in-part of U.S. patent application Ser. No. 13/660,350, filed on Oct. 25, 2012, which claims priority to U.S. Provisional Patent Application No. 61/552,353, filed Oct. 27, 2011, both of which are hereby incorporated by reference, in their entirety.

BACKGROUND

Modern telecommunication service providers generate much of their revenue by selling propriety wireless communication services and devices to their customers, under the good-faith assumption that these services and devices will be utilized in accordance with their intended purposes. For example, a particular telecommunication service provider may allow access to its wireless communication services by selling customers a prepaid or a postpaid, i.e., subscription-based, rate plan, which is generally associated with a respective customer's service level agreement. A telecommunication service provider can also require its customers to purchase corresponding, provider-specific communication devices, including cellular phones, personal digital assistants, tablet computers, and the like, in order to access its proprietary communication services.

Further, telecommunication service providers and mobile device manufacturers enter into lucrative business agreements that contractually bind select manufacturers' products to a particular service provider. In practice, these agreements are based on many important real-world considerations, including a service provider's customer-base, existing market share, forecast device sales, amongst many other factors. However, these mutually beneficial business relationships can be negatively impacted by customer deviations from both expected service usage and retail device purchases. Accordingly, it is important for service providers and affiliated device manufactures to collaborate with each other, in order to ensure that both contracting parties are able to achieve their independent and collective business objectives, in view of these types of consumer anomalies.

Adding to the problem of unanticipated customer deviations, many tech-savvy consumers have contrived new ways to frustrate the business and marketing objectives of both telecommunication service providers and device manufacturers, by employing both software and hardware work-arounds or hacks, which enable them to gain unauthorized access to telecommunication services and devices. This subset of consumers has been able to bypass security measures employed in proprietary communication devices of an affiliated telecommunication service provider, as well as to acquire unaffiliated, generic/unlocked devices, to avoid purchasing services and products from their respective telecommunication service provider.

For example, some telecommunication device users execute unauthorized software to breach certain security features of their respective device, in order to gain root-level access to their device's operating system (OS). Achieving this OS-level access allows a user to download additional applications, extensions, and themes that are not approved by the device's authorized service provider and/or media content provider(s). This misuse of a carrier-locked communication device is sometimes referred to in the industry as "jail-breaking" a device, and it can allow an unlocked, jail-broken device to gain access to unauthorized services of multiple telecommunication service providers.

Another example of a common hardware hack that has been employed by some telecommunication device users is to purchase an after-market product known as a "SIM-shim," which is a thin circuit board that is designed to fit between a service provider's Subscriber Identity Module (SIM) card and a telecommunication device's SIM socket. The SIM-shim device can be employed to allow a user to unlock his or her carrier-locked device, by simply inserting this add-on component into his or her device, thereby effectuating an override of device security features intended to keep the device restricted to services of a specific telecommunication service provider.

As would be understood by those skilled in the art, SIM cards enable a telecommunication service subscriber to be identified on a corresponding service provider's network by storing a unique International Mobile Subscriber Identity (IMSI) that can be retrieved and subsequently authenticated over-the-air by a corresponding service provider, each time a user device engages in communications with its telecommunication service provider. A SIM IMSI generally includes the following information: a Mobile Country Code (MCC), a Mobile Network Code (MNC), and a Mobile Subscriber Identification Number (MSIN). This information allows a user's provider-issued SIM card to be identified, registered, and authenticated with an issuing telecommunication service provider.

Modern SIM cards are sold "as is," meaning they are both static and rate plan specific, as their IMSI data cannot be modified after issuance. For this reason, each time a customer purchases a new telecommunication device or a new service plan offering from its service provider, the customer may be issued a different SIM card that must be added to the customer's existing user account at the service provider. Additionally, most SIM cards typically comprise only enough on-device memory to store static IMSI data along with minimal user contact information, such as a small number of important subscriber contact phone numbers.

BRIEF DESCRIPTION OF THE DRAWINGS

The Detailed Description is set forth with reference to the accompanying figures.

DETAILED DESCRIPTION

It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results, without departing from the spirit and scope of the invention, as claimed.

This disclosure describes techniques for deciding, by a remote provider services entity, whether to unlock functionality of a telecommunication device. The functionality of the telecommunication device may be locked for any of a number of reasons. For example, the rate plan associated with the SIM card may not match a rate plan associated with the telecommunication device, and the telecommunication device may have locked functionality upon detecting this mismatch. Such rate locking is described in detail in U.S. patent application Ser. No. 13/660,350, entitled "Mobile Device-Type Locking" and filed on Oct. 25, 2012. The functionality of the telecommunication device may instead be locked for other reasons. For instance, the telecommunication service provider may have locked the functionality of the telecommunication device in response to the telecommunication device having been reported lost or stolen, in response delinquency in payment for an account associated with the telecommunication device, or in response to expiration of a service plan associated with the telecommunication device.

A user associated with the locked device may contact a telecommunication service provider to unlock the device in any of a number of ways. For example, a provider services entity of the telecommunication service provider may be associated with a website which enables the user to select a device unlock option. Alternatively, the provider services entity may interface with customer care or interactive voice response systems, and the user may call the customer care or interactive voice response systems to request the unlock.

The unlock requested by the user may be a permanent or temporary unlock. If a temporary unlock, the user may select or specify a time period for the unlock. A temporary unlock may be sought, for instance, when the user will be traveling in another country and will need to use a SIM card of a different service provider to access telecommunication services in that country.

When initiating the request, the user may be asked for a device identifier, such as an International Mobile Station Equipment Identity (IMEI), which the provider services entity may validate against a register of device identifiers, such as an equipment identification register (EIR). If the request validates, the request is provided to a policy engine of the provider services entity.

In various embodiments, the policy engine may apply one or more policies received from a policy and subscription manager (hereinafter, "policy manager") of the provider services entity. The policy manager may enable adding, deleting, and editing of the one or more policies. Also, the policy manager may communicate with policy manager tools of a business user responsible for setting or entering policies on behalf of the telecommunication services provider. The policies may reflect business priorities, plans, and decisions of the telecommunication services provider. The business user may also enter policy overrides on a case-by-case basis, which are provided through the policy manager tools to the policy manager and from the policy manager to the policy engine.

The policy engine decides, based at least on the one or more policies, whether to unlock the functionality of the telecommunication device. The policy engine may also take into account a rate plan or account status associated with the telecommunication device. If the request seeks a permanent unlock, and if the policy engine decides based on policies not to unlock the functionality, the policy engine may do one of two things. First, the policy engine may cause a message, such as a short message service (SMS) message, to be sent to the telecommunication device informing the user of the telecommunication device that the request has been denied. Second, the policy engine may decide whether to provide a temporary unlock of the functionality (even though a permanent unlock was sought).

In some embodiments, if the request seeks a temporary unlock, or if the policy engine decides not to provide a permanent unlock, the policy engine decides, based at least in part on the one or more policies, whether to temporarily unlock the functionality. If the policy engine decides against temporarily unlocking the functionality, the policy engine may cause a message, such as a SMS message, to be sent to the telecommunication device informing the user of the telecommunication device that the request has been denied.

If the policy engine decides, based at least in part on the one or more policies, to permanently or temporarily unlock the telecommunication device, the policy engine may cause a message, such as a SMS message, to be sent to the telecommunication device informing the user of the telecommunication device that the unlock has been granted. Such a notification may include the time period for the unlock if the unlock is a temporary unlock. The policy engine also notifies an unlock manager of the provider services entity that the functionality of the telecommunication device is to be permanent or temporarily unlocked and, if temporarily unlocked, of the time period for the temporary unlock.

In some embodiments, the unlock manager has a secured communication session with the telecommunication device. The secure communication may even be extended to an identity module of the telecommunication device, such as a SIM card, through secure agents on a trusted execution environment of the telecommunication device and on the identity module. Such securing is described in greater detail in U.S. patent application Ser. No. 13/839,189, entitled "Secure Environmnt for Subscriber Device" and filed on Mar. 15, 2013. Upon receiving notification of the unlock from the policy engine, the unlock manager transmits unlock instructions over the secure communication session to the telecommunication device, the instructions including a time period when the unlock is a temporary unlock. The telecommunication device may then accomplish the unlock based on the instructions.

Figure 1:
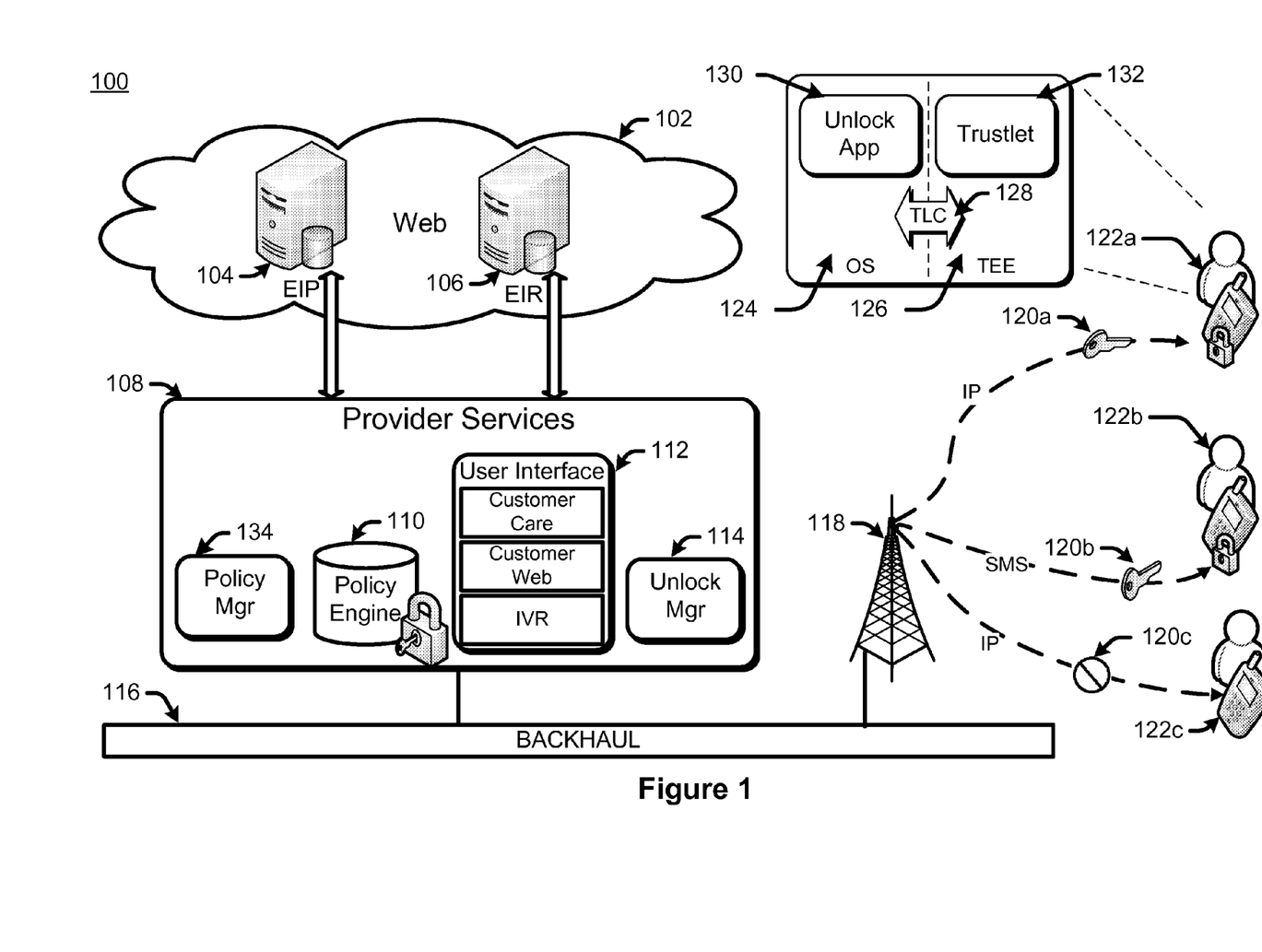
FIG. 1 illustrates an example environment in which a provider services entity remotely unlocks telecommunication devices based on policies and in response to user requests, in accordance with embodiments of the disclosure.

FIG. 1 depicts a telecommunication system/network 100, in accordance with various implementations of the disclosure. The telecommunication system 100 includes, but is not limited to, a provider services entity 108 in communication with multiple affiliated network servers, 104 and 106, and one or more network base stations 118, via portions of a network backhaul 116 and/or via other distributed portions of the network (not shown), respectively having connectivity to the world-wide web 102. Further, system 100 includes an over-the-air (OTA) interface that facilitates radio communications, e.g., wireless Internet Protocol (IP) data and SMS communications 120a-c, and the like, between the provider services entity 108 and one or more user telecommunication devices 122a-c, via a network base station 118.

It should be appreciated that telecommunication system 100 of FIG. 1 is intended to depict a simplified representation of a telecommunication network that can employ any mixture of 2G, 3G, and 4G access technologies, which are commonly utilized in a real-world, heterogeneous telecommunication network deployments. These diverse communication technologies and alternative network topologies are neither depicted nor described within the context of the telecommunication system 100 of FIG. 1, for the sake of brevity.

The telecommunication devices 122 may be representative of any number common wireless communication devices, including cellular phones, tablet computers, electronic book devices, handheld gaming units, personal media players, etc., which can be connected to the telecommunication network 100 utilizing one or more wireless base stations 118, or any other common wireless or wireline network access technology. Further, the user communication devices 122 may be configured to run any known operating system, including but not limited to, Microsoft Windows Mobile®, Google Android®, Apple iOS®, Linux Mobile®, or any other common mobile device operating system.

In various embodiments, each of the telecommunication devices 122 may have an operating system 124 and a trusted execution environment (TEE) 126 connected by a trusted layer connector (TLC) 128. The operating system 124 may include an unlock application 130, which may receive notifications and instructions/triggers 120 from the provider services entity 108. The unlock application 130 may provide the instructions/triggers 120 to a trustlet 132 through the TLC 128, and the trustlet 132 may effect the unlocking of the telecommunication device 122. The trustlet 132 or another component of the TEE 126 may also provide a secure connection to an identification module, such as a SIM card, of the telecommunication device 122. The unlock application 130 may cause display or some other sort of rendering of the notifications. These components 124-132 of the telecommunication device 122 are described in greater detail in U.S. patent application Ser. No. 13/839,189, entitled "Secure Environment for Subscriber Device" and filed on Mar. 15, 2013.

It should also be appreciated that the telecommunication system 100 could be configured to employ any combination of common wireless broadband communication technologies, including, but not limited to, Long Term Evolution (LTE), LTE Advanced, High-Speed Data Packet Access (HSDPA), Evolved High-Speed Packet Access (HSPA+), Universal Mobile Telecommunication System (UMTS), Code-Division Multiple Access (CDMA), Global System for Mobile Communications (GSM), WiMax, and WiFi. Further, the backhaul portion 116 of the telecommunication network 100 may be configured to employ any common wireline communication technology, including but not limited to, optical fiber, coaxial cable, twisted pair cable, Ethernet cable, and power-line cable, along with any common wireless communication technology, such as those described above.

In some embodiments, the provider services entity 108 may include, but is not limited to, the following elements: a policy engine 110, a user interface (UI) component 112, an unlock manager 114, such as a mobile device management/trusted service manager (MDM/TSM) component, and a policy manager 134. In a scenario where a particular telecommunication device 122 has been locked, a user can be proactive in remedying this problem by contacting its telecommunication service provider and interacting with its provider services entity 108 via UI tools of its UI component 112. One of these UI tools of the UI component 112 can be a traditional customer care center that allows a user of a locked telecommunication device 122 to call in and speak directly with a customer service representative of its telecommunication service provider.

Another UI tool of the UI component 112 may be a customer web interface that allows a user of a locked telecommunication device 122 to utilize a dedicated customer account webpage (not shown) of a corresponding service provider website, to perform various user-driven account management functions. In one implementation, a user-driven account management function of a customer's account webpage can facilitate a user unlocking their telecommunication device 122 over the Internet/Web 102. By way of example, this particular scenario may occur when a subscriber decides to pay a past due monthly service fee online, i.e., by credit card, using a secure online payment system of the service provider's website to initiate an unlock action 120 for their telecommunication device 122. The telecommunication device 122 may have been locked based on the provider services entity 108 previously consulting a local or networked equipment identity payment (EIP) server 104, to identify a telecommunication device 122 associated with the delinquent customer account, and then lock the device 122c.

An additional UI tool of the UI component 112 may be an Interactive Voice Response (IVR) system, which allows a user to call a phone number associated with the IVR system and then follow pre-recorded voice instructions/prompts to attempt to unlock their communication device, in a similar manner to the other UI tool routines described above.

Regardless of which UI tool of the UI component 112 is used, the user may provide a request for a permanent or temporary unlock of the telecommunication device 122. If a temporary unlock, the user may select or specify a time period for the unlock. A temporary unlock may be sought, for instance, when the user will be traveling in another country and will need to use a SIM card of a different service provider to access telecommunication services in that country.

When initiating the request, the user may be asked for a device identifier, such as a IMEI, which the provider services entity may validate against a register of device identifiers, such as the EIR 106. If the request validates, the request is provided to a policy engine 110 of the provider services entity 108.

The policy engine 110 of the provider services entity 108 can advantageously maintain user account information, as well as service provider policies within a resident or distributed service provider data store, to enable customer accounts and affiliated telecommunication devices 122 to be managed by a corresponding telecommunication service provider using the provider services entity 108. In various scenarios, a particular service provider may also elect to enforce preferred service policies via its policy engine 110, in such a manner as to facilitate any of the above unlocking schemes with its UI component 112.

In various embodiments, one or more policies may be received by the policy engine 110 from a policy and subscription manager 134 (hereinafter, "policy manager 134") of the provider services entity 108. The policy manager 134 may enable adding, deleting, and editing of the one or more policies. Also, the policy manager 134 may communicate with policy manager tools of a business user responsible for setting or entering policies on behalf of the telecommunication services provider. The policies may reflect business priorities, plans, and decisions of the telecommunication services provider. The business user may also enter policy overrides on a case-by-case basis, which are provided through the policy manager tools to the policy manager 134 and from the policy manager 134 to the policy engine 110.

In various embodiments, the policy engine 110 decides, based at least on the one or more policies, whether to unlock the functionality of a telecommunication device 122. The policy engine 110 may also take into account a rate plan or account status associated with the telecommunication device 122, such as an account status retrieved from EIP 104. If the request seeks a permanent unlock, and if the policy engine 110 decides based on policies not to unlock the functionality, the policy engine 110 may do one of two things. First, the policy engine 110 may cause a message, such as a SMS message, to be sent to the telecommunication device 122 informing the user of the telecommunication device 122 that the request has been denied. Second, the policy engine 110 may decide whether to provide a temporary unlock of the functionality (even though a permanent unlock was sought).

In some embodiments, if the request seeks a temporary unlock, or if the policy engine 110 decides not to provide a permanent unlock, the policy engine 110 decides, based at least in part on the one or more policies, whether to temporarily unlock the functionality. If the policy engine 110 decides against temporarily unlocking the functionality, the policy engine 110 may cause a message, such as a SMS message, to be sent to the telecommunication device 122 informing the user of the telecommunication device 122 that the request has been denied.

If the policy engine 110 decides, based at least in part on the one or more policies, to permanently or temporarily unlock the telecommunication device 122, the policy engine 110 may cause a message, such as a SMS message, to be sent to the telecommunication device 122 informing the user of the telecommunication device 122 that the unlock has been granted. Such a notification may include the time period for the unlock if the unlock is a temporary unlock. The policy engine 110 also notifies an unlock manager 114 of the provider services entity 108 that the functionality of the telecommunication device 122 is to be permanent or temporarily unlocked and, if temporarily unlocked, of the time period for the temporary unlock.

In some embodiments, the unlock manager 114 of the provider services entity 108 may communicate device unlocking triggers 120a-b, also referred to as unlocking instructions, or service blocking triggers 120c to the telecommunication devices 122a-c using SMS messages, i.e., via a short messaging service center (SMSC), IP messages, i.e., via gateway GPRS and/or serving GPRS support nodes (GGSNs or SGSNs), or by any other common messaging protocol. The unlock manager 114 may communicate the unlocking triggers 120a-b responsive to the telecommunication devices 122a-b responsive to receiving notifications from the policy engine 110 that the telecommunication devices 122a-b are to be unlocked. The unlock manager 114 may communicate the unlocking triggers 120a-b using secure communication sessions with the telecommunication devices 122a-b, as discussed above.

Figure 2:
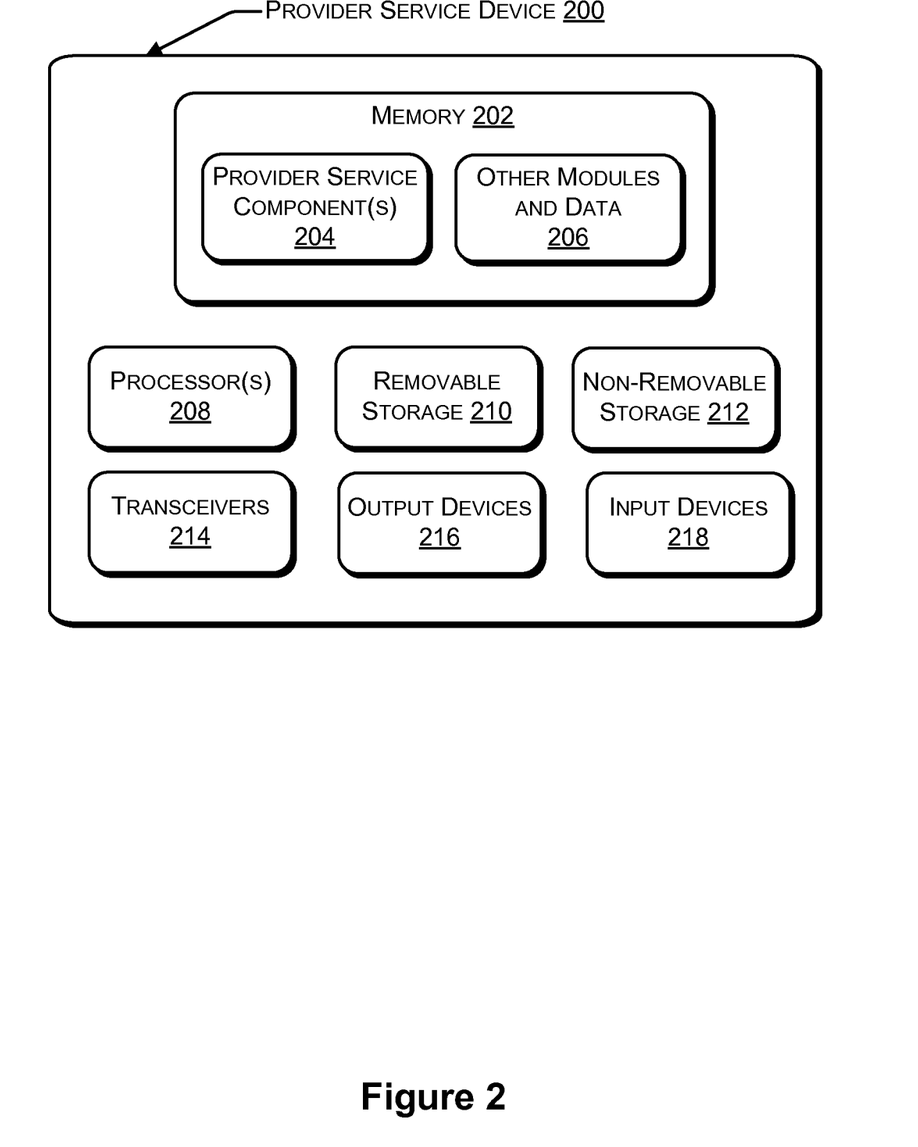
FIG. 2 is a component level view of a computing device associated with a provider services entity, in accordance with embodiments of the disclosure.

FIG. 2 is a component level view of a computing device associated with a provider services entity, in accordance with embodiments of the disclosure. As illustrated, the computing device 200 comprises a system memory 202 storing one or more provider service component(s) 204 and other modules and data 206. Also, the computing device 200 includes processor(s) 208, a removable storage 210, a non-removable storage 212, transceivers 214, output device(s) 216, and input device(s) 218.

In various embodiments, system memory 202 is volatile (such as RAM), non-volatile (such as ROM, flash memory, etc.) or some combination of the two. The provider service component(s) 204 may be any one or more of the policy engine 110, the user interface 112, the unlock manager 114, or the policy manager 134 described above in detail with regard to FIG. 1. The other modules or data 206 stored in the system memory 202 may comprise any sort of applications or platform components of the computing device 200, as well as data associated with such applications or platform components.

In some embodiments, the processor(s) 208 is a central processing unit (CPU), a graphics processing unit (GPU), or both CPU and GPU, or any other sort of processing unit.

The computing device 200 also includes additional data storage devices (removable and/or non-removable) such as, for example, magnetic disks, optical disks, or tape. Such additional storage is illustrated in FIG. 2 by removable storage 210 and non-removable storage 212. Tangible computer-readable media may include volatile and nonvolatile, removable and non-removable media implemented in any method or technology for storage of information, such as computer readable instructions, data structures, program modules, or other data. System memory 202, removable storage 210 and non-removable storage 212 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 200. Any such tangible computer-readable media may be part of the computing device 200.

In some embodiments, the transceivers 214 include any sort of transceivers known in the art. For example, transceivers 214 may include a radio transceiver that performs the function of transmitting and receiving radio frequency communications via an antenna. The transceivers 214 may include wired communication components, such as an Ethernet port, that connect the computing device 200 in a wired fashion to the backhaul 116 or to one or more other devices of the provider service entity 108. In addition, the transceivers 214 may facilitate wireless connectivity between the computing device 200 and the backhaul 116 or one or more other devices of the provider service entity 108.

In some embodiments, the output devices 216 include any sort of output devices known in the art, such as a display (e.g., a liquid crystal display), speakers, a vibrating mechanism, or a tactile feedback mechanism. Output devices 216 also include ports for one or more peripheral devices, such as headphones, peripheral speakers, or a peripheral display.

In various embodiments, input devices 218 include any sort of input devices known in the art. For example, input devices 218 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 3:
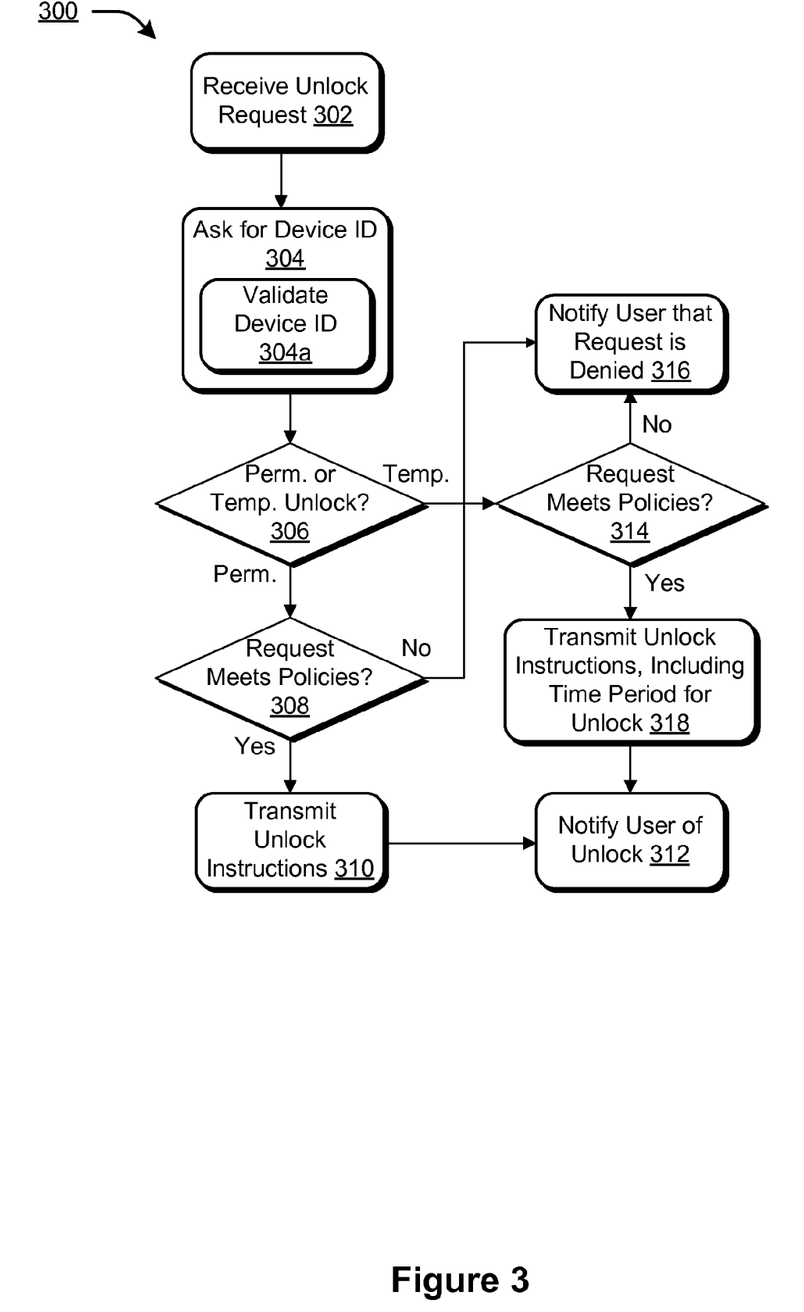
FIG. 3 is a flow chart of an example process for deciding, by a provider services entity, whether to unlock functionality of a telecommunication device based on policies and in response to a user request, in accordance with embodiments of the disclosure.

FIG. 3 illustrates an example process 300. This process 300 is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 is a flow chart of an example process for deciding, by a provider services entity, whether to unlock functionality of a telecommunication device based on policies and in response to a user request, in accordance with embodiments of the disclosure. The process 300 includes, at 302, receiving a request to unlock functionality of a telecommunication device. The request may be received through at least one of a website, a customer care system, or an IVR system. The telecommunication device may locked because the telecommunication device includes an identification module that is associated with a different service plan than the telecommunication device, because an account associated with the telecommunication device indicates that a subscriber is delinquent in payment or that a subscription associated with the account is expired, or because the telecommunication device has been reported lost or stolen.

At 304, a user associated with the request may be asked to enter a device identifier for the telecommunication device. At 304a, the device identifier may be validated against a device entity register.

At 306, a policy engine of the provider services entity determines whether the request is a request for a permanent unlock or a temporary unlock based on whether the request indicates that a permanent unlock or temporary unlock is sought. When the request is a request for a temporary unlock, the request may specify a time period associated with the temporary unlock being sought.

At 308, when the request is determined to be a request for a permanent unlock, the policy engine may decide, based at least in part on one or more policies, whether to unlock the functionality. In some embodiments, the deciding may further be based on a rate plan and account status associated with the telecommunication device.

At 310, if the policy engine decides to permanently unlock the functionality, instructions are transmitted to the telecommunication device to unlock the functionality. This transmission may be performed by an unlock manager responsive to the unlock manager receiving a notification from the policy engine that the policy engine has decided to unlock the functionality. At 312, the policy engine may also cause transmission of a notification to a user associated with the telecommunication device indicating that the functionality will not be unlocked.

At 314, if the policy engine decides not to permanently unlock the functionality, the policy engine can decide, based on one or more policies whether to temporarily unlock the functionality. In some embodiments, the deciding may further be based on a rate plan and account status associated with the telecommunication device. Alternatively, at 316, if the policy engine decides not to permanently unlock the functionality, the policy engine may simply notify a user associated with the telecommunication device that the request is denied.

The deciding at 314 may also be performed responsive to determining, at 306, that the request seeks a temporary unlock of the functionality. If the policy engine decides, based at least in part on one or more policies, against temporarily unlocking the functionality, the policy engine may, at 316, notify a user associated with the telecommunication device that the request is denied.

At 318, if the policy engine decides, based at least in part on one or more policies, to temporarily unlock the functionality, instructions are transmitted to the telecommunication device to temporarily unlock the functionality. Such instructions may include the time period for the unlock. This transmission may be performed by an unlock manager responsive to the unlock manager receiving a notification from the policy engine that the policy engine has decided to temporarily unlock the functionality. At 312, the policy engine may also cause transmission of a notification to a user associated with the telecommunication device indicating that the functionality will not be temporarily unlocked Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving, by one or more provider service devices of a telecommunication service provider, a request to permanently unlock a telecommunication device that is locked to the telecommunication service provider;
   deciding, by the one or more provider service devices, based at least in part on one or more policies, not to permanently unlock the telecommunication device from the telecommunication service provider but to, instead, temporarily unlock the telecommunication device from the telecommunication service provider; and
   in response to deciding to temporarily unlock the telecommunication device from the telecommunication service provider, transmitting, by the one or more provider service devices, instructions to the telecommunication device to temporarily unlock the telecommunication device from the telecommunication service provider, the instructions specifying a time period,
   wherein the one or more provider service devices and the telecommunication device are different computing devices.

2. The method of claim 1, wherein the request is received through at least one of a website, a customer care system, or an interactive voice response system.

3. The method of claim 1, further comprising, in response to receiving the request, asking a user associated with the request to enter a device identifier for the telecommunication device.

4. The method of claim 3, further comprising validating the device identifier with a device identifier register.

5. The method of claim 1, wherein the request includes an indication that a temporary unlock is not sought.

6. The method of claim 1, further comprising, in response to deciding not to permanently unlock the telecommunication device from the telecommunication service provider, transmitting a notification message to the telecommunication device indicating that the telecommunication device will not be permanently unlocked from the telecommunication service provider.

7. The method of claim 1, further comprising notifying a user associated with the telecommunication device of the decision to temporarily unlock the telecommunication device from the telecommunication service provider.

8. The method of claim 1, wherein the transmitting comprises notifying an unlock manager of the one or more provider service devices of the decision to temporarily unlock the telecommunication device from the telecommunication service provider, the unlock manager transmitting the instructions to the telecommunication device to temporarily unlock the telecommunication device from the telecommunication service provider.

9. The method of claim 8, further comprising securing a communication session between the unlock manager and the telecommunication device.

10. The method of claim 1, wherein the deciding is further based on a rate plan and account status associated with the telecommunication device.

11. The method of claim 1, wherein the telecommunication device is locked to the telecommunication service provider because the telecommunication device includes an identification module that is associated with a different service plan than the telecommunication device, because an account associated with the telecommunication device indicates that a subscriber is delinquent in payment or that a subscription associated with the account is expired, or because the telecommunication device has been reported lost or stolen.

12. A system of a telecommunication service provider comprising:
   a processor;
   a user interface configured to be operated by the processor to enable a user to request unlocking of a telecommunication device that is locked to the telecommunication service provider;
   a policy engine configured to be operated by the processor to receive the request from the user interface and to decide, based at least in part on one or more policies, whether to unlock the telecommunication device from the telecommunication service provider; and
   an unlock manager configured to be operated by the processor to receive notification from the policy engine of the decision to unlock the telecommunication device from the telecommunication service provider and to transmit unlock instructions to the telecommunication device,
   wherein the request includes an indication of whether a temporary unlock is sought, and
   wherein the system and the telecommunication device are different computing devices.

13. The system of claim 12, further comprising a policy manager to enable adding, deleting, and editing of the one or more policies.

14. The system of claim 13, wherein the policy manager is further to enable case-by-case unlocking of the telecommunication device from the telecommunication service provider which contravenes at least one policy of the policy engine.

15. The system of claim 12, wherein the unlock manager has a secure connection to an identity module of the telecommunication device.

16. One or more computer storage devices having stored thereon a plurality of executable instructions configure to program a computing device of a telecommunication service provider to perform operations comprising:
   receiving a request to permanently unlock a telecommunication device that is locked to the telecommunication service provider;
   deciding, based at least in part on one or more policies, not to provide a permanent unlock for the telecommunication device from the telecommunication service provider but to, instead, temporarily unlock the telecommunication device from the telecommunication service provider; and
   in response to deciding to temporarily unlock the telecommunication device from the telecommunication service provider, transmitting instructions to the telecommunication device to temporarily unlock the telecommunication device from the telecommunication service provider, the instructions specifying a time period,
   wherein the computing device and the telecommunication device are different computing devices.

* * * * *